Figure 1:
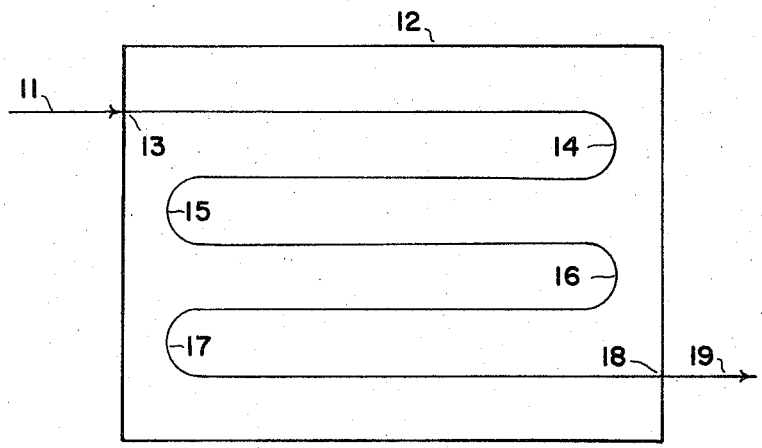

Feb. 28, 1967     R. H. BRIERLEY ETAL     3,306,844
HYDROCARBON THERMAL CRACKING IN A TUBULAR REACTOR
Filed July 27, 1964     2 Sheets-Sheet 1

INVENTOR.
Ronald H. Brierley
Gordon E. Davenport
Clarence L. Dulaney
BY

United States Patent Office 3,306,844
Patented Feb. 28, 1967

3,306,844
HYDROCARBON THERMAL CRACKING
IN A TUBULAR REACTOR
Ronald H. Brierley, La Puente, Calif., and Clarence L.
Dulaney, Texas City, and Gordon E. Davenport, Alvin,
Tex., assignors to Monsanto Company, St. Louis, Mo.,
a corporation of Delaware
Filed July 27, 1964, Ser. No. 385,209
16 Claims. (Cl. 208—132)

The present invention relates to a process for the conversion of hydrocarbons. More particularly, the present invention relates to thermal cracking and to an improvement therein.

It has long been known that non-catalytic thermal cracking provides a very useful means of converting relatively high molecular weight petroleum-derived feed stocks into normally gaseous olefins and diolefins which are generally in high demand for producing polymeric plastic compositions and other utilities. A particularly useful type of thermal cracking process for producing normally gaseous olefins and diolefins is one using relatively long tubular reactors and temperatures in excess of 500° C. at elevated pressures. However, in many instances the yields of the low molecular weight normally gaseous olefin and diolefins from such thermal cracking processes are unsatisfactory from an economic standpoint and have failed to meet the great demand for such products. Therefore, considerable attention has been directed toward increasing the yield of these hydrocarbons from such thermal cracking processes.

It is now an object of the present invention to provide a process for the conversion of hydrocarbons. Another object of the present invention is to provide a process for the thermal cracking of relatively high molecular weight petroleum-derived feed stocks. It is another object of the present invention to provide an improvement in the process of thermally cracking a petroleum-derived feed stock whereby substantially increased yields of normally gaseous olefin hydrocarbons are obtained. Additional objects will become apparent from the following description of the invention herein disclosed.

The present invention which fulfills these and other objects comprises a process for the non-catalytic thermal cracking of hydrocarbons which comprises passing a hydrocarbon cracking stock through a tubular reactor or cracking furnace at an elevated pressure while maintaining said reactor with an inlet temperature of 450 to 750° C., and an outlet temperature of 700 to 950° C., the temperature difference between said inlet temperature and said outlet temperature being at least 50° C. and the temperature profile within said tubular reactor being such that at ⅕ the distance from the inlet end of said reactor the temperature within said reactor is increased above the inlet temperature by an amount equivalent to 4 to 10 percent of said temperature difference, at ⅖ the distance from the inlet end of said reactor the temperature within said reactor is increased above the inlet temperature by an amount equivalent to 10 to 25 percent of said temperature difference, at ⅗ of the distance from the inlet end of said reactor the temperature within said reactor is increased above the inlet temperature by an amount equivalent to 20 to 42 percent of said temperature difference and at ⅘ of the distance from the inlet end of said reactor the temperature within said reactor is increased above the inlet temperature by an amount equivalent to 40 to 64 percent of said temperature difference. The present invention produces a significant increase in the yield of normally gaseous olefin and diolefin hydrocarbon products as compared to yields normally obtained by the non-catalytic thermal cracking of hydrocarbons.

Figure 2:
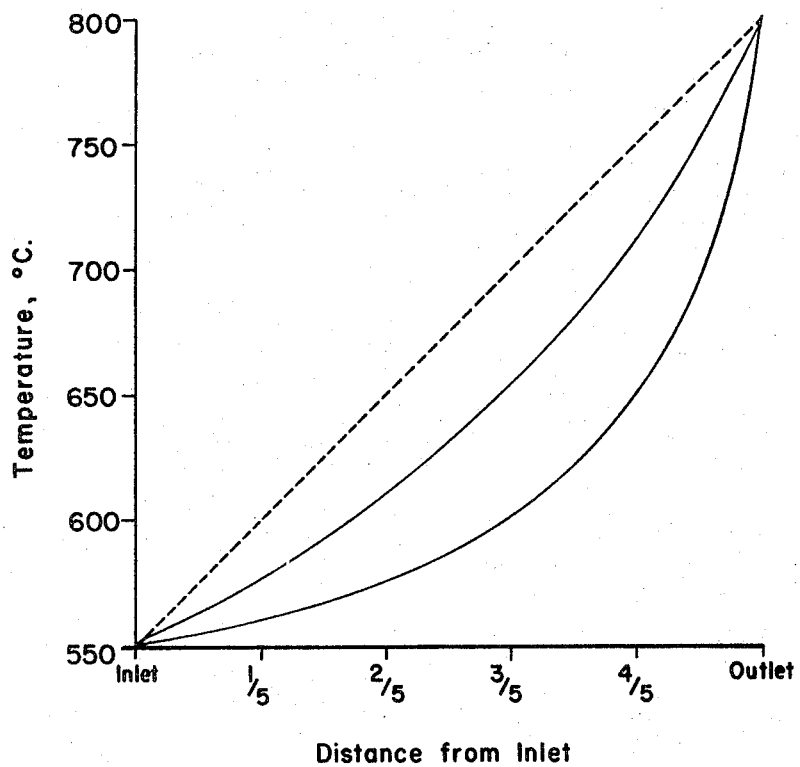

In order to further describe the present invention, reference is made to the accompanying drawings. FIGURE 1 is a schematic representation of the present invention. FIGURE 2 is a graph which illustrates the present invention.

Referring to FIGURE 1, a petroleum-derived feed stock is passed to cracking unit 12 by means of line 11 and introduced into cracking unit 12 through inlet opening 13. Within cracking unit 12 the feedstock passes through a tubular reactor and exits the cracking unit through outlet opening 18 and then passes by means of line 19 to subsequent processing. The tubular reactor within cracking unit 12 is divided into five sections of approximately equal length by elbows 14, 15, 16 and 17. In accordance with the present invention the inlet temperature at inlet opening 13 must be at least 50° C. less than the outlet temperature at outlet 18. The temperature at elbow 14 which is located at a distance of approximately ⅕ of the total length of the tubular reactor from inlet 13 is in the inlet temperature at inlet 13 plus 4 to 10 percent of the difference in temperature between inlet 13 and outlet 18. Foir example, if the inlet temperature at inlet 13 is 550° C. and the outlet temperature at outlet 18 is 750° C. then the temperature at elbow 14 will be 550 plus 4 to 10 percent of 200 or 550 plus 8 to 20° C. or 558 to 570° C. At elbow 15 which is located at a distance of approximately ⅖ of the total length of the tubular reactor, the temperature is the inlet temperature plus 10 to 25 percent of the difference in temperature between the inlet and outlet temperatures. Elbows 16 and 17 located at ⅗ and ⅘ the distance of the total length of the tubular reactor, respectively, will have temperatures also obtained by adding the inlet temperature to a percent of the difference between the inlet and outlet temperatures as hereinafter defined.

In FIGURE 2, a curve is presented which illustrates the internal temperature ranges at any point along the reactor length in a thermal cracking operation in which the inlet temperature of the tubular reactor is 550° C. and the outlet temperature 800° C. This curve is based on the temperature at ⅕, ⅖, ⅗, and ⅘ of the total reactor length. The heavy curved lines 1 and 2 illustrate the high and low temperatures, respectively, permissible at the four points in accordance with the present invention. The broken line 3 illustrates the conventional straight-line profile of temperatures within the reactor. The location of the points of the curve is determined as hereinabove described. To use the curve to find the temperature limitations at points other than the points used to plot the curves of FIGURE 2 is readily within the ability of those skilled in the art. Of particular note in FIGURE 2 is the higher temperature curve obtained in the practice of the present invention. This higher temperature is at all times between the inlet and outlet, lower than the temperature at the same point as obtained by the straight-line profile.

In order to further describe as well as to illustrate the present invention, the following example is presented. This example is in no manner to be constructed as limiting the present invention.

EXAMPLE

Two series of cracking runs were carried out in a tubular reactor having an internal diameter of approximately ⅜ inch and a length of approximately 32 feet. In one series of runs, designated Runs A–1, A–2 and A–3, the internal temperatures were varied in accordance with the present invention while in the other series of runs, designated Runs B–1, B–2 and B–3, the internal temperatures were varied in accordance with a standard method known as the straight-line method. In this latter method the temperature within the furnace is continuously increased by equal increments for each segment of the furnace such that if temperature is plotted against distance within the tubular reactor, a straight line will be obtained. The inlet temperature for each of the runs was 550° C. and the outlet temperatures were varied as shown below. In each of the runs the feed used was a condensate having an initial boiling point of 112° F. and an 80 percent boiling point of 660° F., an API gravity of 48 and a pour point of 35° F. The pressure in each run was 45 p.s.i.g. and the feed was introduced into the reactor at a rate of approximately 4.9 to 5.9 lb./hr. Steam was introduced concurrently with the feed in a ratio of steam to oil of 0.3 lbs. of steam per lb. of oil.

The Table I below presents the temperature at five different points within the tubular reactor for each of the runs in each series. Each point being one-fifth (⅕) of the distance of the tubular reactor separated from the other adjacent points or the inlet with the last of the five temperatures given being the outlet temperature. Table II below presents the ethylene yield from each of the runs of Table I.

TABLE I

| Distance From Inlet | Temperature, ° C. | | | | | |
|---|---|---|---|---|---|---|
| | Series A | | | Series B | | |
| | Run A-1 | Run A-2 | Run A-3 | Run B-1 | Run B-2 | Run B-3 |
| ⅕ | 560 | 563 | 565 | 590 | 595 | 600 |
| ⅖ | 575 | 585 | 587 | 630 | 640 | 650 |
| ⅗ | 597 | 612 | 622 | 670 | 685 | 700 |
| ⅘ | 640 | 664 | 687 | 710 | 730 | 750 |
| Outlet | 750 | 800 | 825 | 750 | 775 | 800 |

TABLE II

| | Run | | | | | |
|---|---|---|---|---|---|---|
| | A-1 | A-2 | A-3 | B-1 | B-2 | B-3 |
| Ethylene, percent by weight | 18.2 | 19.4 | 19.9 | 16.3 | 17.3 | 18.6 |

Comparison of the above yield data demonstrates the advantage derived from the present invention. For example, in Runs A-1 and B-1 all conditions were the same except for the internal temperature profile, yet ethylene yield in Run A-1 represented a 11.7 percent increase over that of Run B-1. Similarly a 7.0 percent increase was obtained in Run A-2 as compared to Run B-3.

The feedstocks which may be thermally cracked in accordance with the present invention are broadly described as any of the hydrocarbon materials capable of being cracked to yield normally gaseous unsaturated hydrocarbons as products. These feedstocks are generally petroleum-derived. Included within this category are naturally occurring petroleum feedstocks as well as petroleum-derived materials obtained as product streams from various refining operations such as distillation, cracking, extraction and the like. These petroleum-derived feeds may range from light naphthas to heavy crudes and may range in boiling range from as low as 20° C. to 600° C. and higher. Particularly preferred feed stocks to the thermal cracking process of the present invention are petroleum condensates having a boiling range substantially (above 90 percent) within the range of 30° C. to 450° C.

The pressure within the tubular thermal cracking furnace may range from subatmospheric pressures to as high at 150 p.s.i.g. However, it is usually preferred that a pressure of substantially atmospheric to 100 p.s.i.g. be maintained within the thermal cracking zone.

In practicing the present invention the inlet temperature of the tubular reactor or cracking furnace is usually within the range of from approximately 450 to 750° C. However, an inlet temperature of from approximately 525 to 650° C. is preferred. Outlet temperatures from the tubular cracking furnace must be at least 50° C. greater than the inlet temperature. Generally outlet temperatures are within the range of from 700 to 950° C. though it is preferred that the outlet temperatures be within the range of from 750 to 900° C. The internal temperatures within the tubular cracking furnace vary between the inlet and outlet temperatures. These internal temperatures are determined by adding to the inlet temperature of the cracking furnace a percent of the difference between the outlet and inlet temperatures. The method of calculating the internal temperatures is hereinabove illustrated in reference to the drawing. The following table presents the percent of the difference between inlet and outlet temperatures which is to be added to the inlet temperature in order to obtain the temperature limitation for various points within the tubular reactor expressed in relation to the distance from the inlet as a fraction of the total length of the reactor.

| Distance from inlet: | Percent of difference |
|---|---|
| ⅕ | 4 to 10 |
| ⅖ | 10 to 25 |
| ⅗ | 20 to 42 |
| ⅘ | 40 to 64 |

A preferred range of internal temperatures is obtained by adding to the inlet temperatures of the tubular cracking furnace a percent of the difference between the inlet and outlet temperatures of the cracking furnace in accordance with the following table.

| Distance from inlet: | Percent of difference |
|---|---|
| ⅕ | 4 to 8 |
| ⅖ | 12 to 18 |
| ⅗ | 22 to 30 |
| ⅘ | 42 to 52 |

The above tables present a method for obtaining the internal temperature for four points within the tubular cracking furnace. The present invention, of course, is in no manner limited by the teachings of only four points. If the optimum temperatures for 10 points within the tubular reactor are desired then the above data in regard to four points may be plotted on standard graph paper against reactor length and the 10 points obtained from the resulting curve.

The rate at which the hydrocarbon feed is passed into the thermal cracking zone may range from 50 to 500 lbs. of feed per hour per cubic foot of volume of reactor space. It is somewhat more preferred that this space velocity be 100 to 300 lbs. of feed per hour per cubic foot of volume of reactor space.

The use of diluents such as steam or inert gases in thermal cracking processes is well known and widely used, particularly in thermal cracking processes operating at or near atmospheric pressures. Primarily because of its low cost and ease of handling as well as other desirable properties, steam is the most widely used and preferred diluent. However, inert gases such as nitrogen may also be used. When diluents are used, they will generally be used in a ratio of diluent-to-charge of 0.1 to 5.0 liquid volumes, preferably 0.2 to 2.0 liquid volumes, of diluent per liquid volume of the hydrocarbon charge.

The apparatus for carrying out the present invention may be any of the conventional tubular thermal cracking furnaces or any modification thereof. Generally, it is somewhat preferred that the length to diameter relationship of the tubular cracking furnace be such that the length be at least 20 times the diameter. Preferably, the tubular cracking furnace is one having a length at least 250 times greater than its diameter. Otherwise, it is only necessary that the cracking apparatus conform to good engineering principles.

What is claimed is:
1. A process for the non-catalytic thermal cracking of hydrocarbons which comprises passing a hydrocarbon cracking stock through a tubular reactor at a pressure of from substantially atmospheric to 150 p.s.i.g. and while maintaining said reactor with an inlet temperature of 450 to 750° C., and an outlet temperature of 700 to 950° C., the temperature difference between said inlet temperature and said outlet temperature of at least 50° C. and the temperature profile within said tubular reactor being such that at $\frac{1}{5}$ the distance from the inlet end of said reactor the temperature within said reactor is increased above the inlet temperature by an amount equivalent to 4 to 10 percent of said temperature difference, at $\frac{2}{5}$ the distance from the inlet end of said reactor the temperature within said reactor is increased above the inlet temperature by an amount equivalent to 10 to 25 percent of said temperature difference, at $\frac{3}{5}$ of the distance from the inlet end of said reactor the temperature within said reactor is increased above the inlet temperature by an amount equivalent to 20 to 42 percent of said temperature difference, at $\frac{4}{5}$ of the distance from the inlet end of said reactor the temperature within said reactor is increased above the inlet temperature by an amount equivalent to 40 to 64 percent of said temperature difference and at $\frac{9}{10}$ of the distance from the inlet end of said reactor the temperature within said reactor is increased above the inlet temperature by an amount equivalent to 58 to 80 percent of said temperature difference, said hydrocarbon cracking stock being a petroleum condensate having a boiling range within the temperature range of 20 to 600° C.

2. The process of claim 1 wherein the pressure within the tubular reactor is maintained from substantially atmospheric to 100 p.s.i.g.

3. The process of claim 1 wherein the hydrocarbon cracking stock is passed into the thermal cracking zone at a rate of 50 to 500 lbs. of feed per hour per cubic foot of volume of reactor space.

4. The process of claim 1 wherein a diluent is introduced into the non-catalytic thermal cracking zone concurrently with the cracking stock.

5. The process of claim 1 wherein the tubular reactor has a length to diameter ratio of at least 20:1.

6. The process of claim 1 wherein the hydrocarbon cracking stock is a petroleum condensate having a boiling range within the temperature range of 30 to 450° C.

7. The process of claim 1 wherein the inlet temperature is 525 to 650° C.

8. The process of claim 1 wherein the outlet temperature is 750 to 900° C.

9. A process for the non-catalytic thermal cracking of hydrocarbons which comprises passing a hydrocarbon cracking stock through a tubular reactor at a pressure of from substantially atmospheric to 150 p.s.i.g. and while maintaining said reactor with an inlet temperature of 450 to 750° C., an outlet temperature of 700 to 950° C. and a difference between said inlet temperature and said outlet temperature of at least 50° C. and a temperature profile within said tubular reactor such that at $\frac{1}{5}$ the distance of said reactor the temperature within said reactor is increased above the inlet temperature by an amount equivalent to 4 to 8 percent of said difference between said inlet and outlet temperatures, at $\frac{2}{5}$ the distance of said reactor the temperature within said reactor is increased above the inlet temperature by an amount equivalent to 12 to 18 percent of said difference between said inlet and outlet temperatures, at $\frac{3}{5}$ of said distance of said reactor the temperature within said reactor is increased above the inlet temperature by an amount equivalent to 22 to 30 percent of said difference between said inlet and outlet temperatures and at $\frac{4}{5}$ of said distance of said reactor the temperature within said reactor is increased above the inlet temperature by an amount equivalent to 42 to 52 percent of said difference between said inlet and outlet temperatures and at $\frac{9}{10}$ the distance of said reactor the temperature within said reactor is increased above the inlet temperature by an amount equivalent to 60 to 72 percent of said difference between said inlet and outlet temperatures, said hydrocarbon cracking stock being a petroleum condensate having a boiling range within the temperature range of 20 to 600° C.

10. The process of claim 9 wherein the pressure within the tubular reactor is maintained from substantially atmospheric to 100 p.s.i.g.

11. The process of claim 9 wherein the hydrocarbon cracking stock is passed into the thermal cracking zone at a rate of 50 to 500 lbs. of feed per hour per cubic foot of volume of reactor space.

12. The process of claim 9 wherein a diluent is introduced into the non-catalytic thermal cracking zone concurrently with the cracking stock.

13. The process of claim 9 wherein the tubular reactor has a length to diameter ratio of at least 20:1.

14. The process of claim 9 wherein the hydrocarbon cracking stock is a petroleum condensate having a boiling range within the temperature range of 30 to 450° C.

15. The process of claim 9 wherein the inlet temperature is 525 to 650° C.

16. The process of claim 9 wherein the outlet temperature is 750 to 900° C.

References Cited by the Examiner

UNITED STATES PATENTS

| | | | |
|---|---|---|---|
| 2,917,564 | 12/1959 | Pollock | 208—132 |
| 3,112,880 | 12/1963 | Pollock | 208—132 |

OTHER REFERENCES

Andrews et al.: "Ind. and Eng. Chem.," vol. 51, No. 2, February 1959, pages 125 to 128.

DELBERT E. GANTZ, *Primary Examiner.*

H. LEVINE, *Assistant Examiner.*